Aug. 4, 1942.        J. L. STRATTON            2,292,173
            ELECTRIC VALVE CONTROL CIRCUIT
                   Filed Feb. 24, 1941
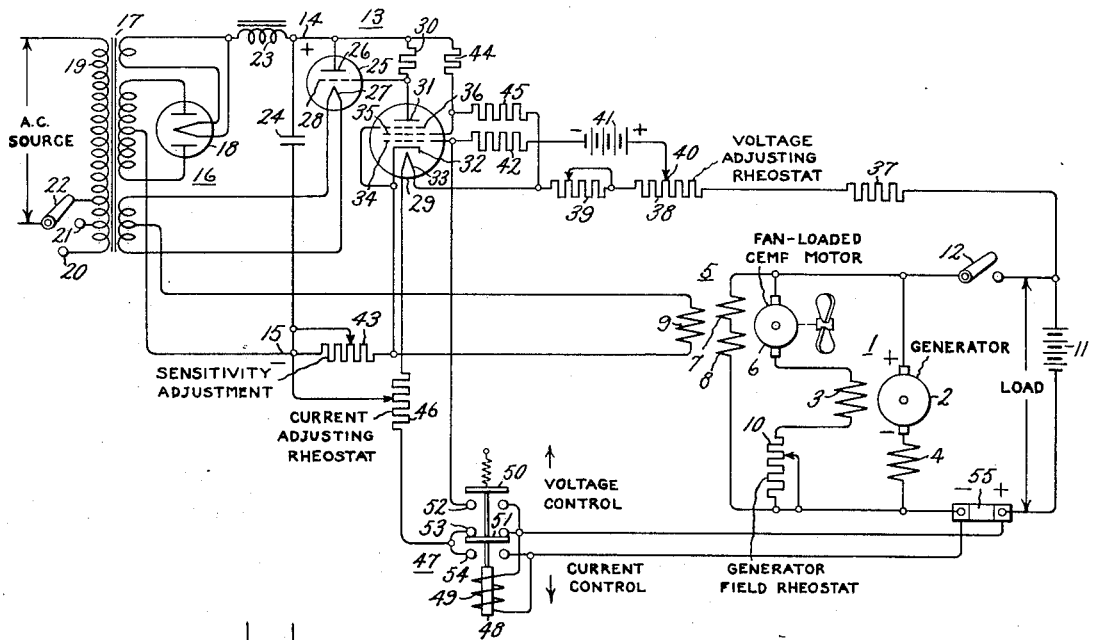
Inventor:
Jerry L. Stratton,
by Harry E. Dunham
His Attorney.

Patented Aug. 4, 1942

2,292,173

UNITED STATES PATENT OFFICE 2,292,173

ELECTRIC VALVE CONTROL CIRCUIT

Jerry L. Stratton, Schenectady, N. Y., assignor to General Electric Company, a corporation of New York Application February 24, 1941, Serial No. 380,228

14 Claims. (Cl. 171—225)

My invention relates to electric valve control circuits and more particularly to electric valve systems for precisely energizing a load circuit in response to a predetermined controlling influence, such as voltage or current.

Electric valve equipment for electronic discharge apparatus has found an expanding field of application in the control of dynamo-electric machines and in the control of electrical conditions, such as voltage and current, of associated load circuits. In accordance with the teachings of my invention described hereinafter, I provide a new and improved electric control system which affords greater precision in control and operation than that provided by the prior art arrangements.

It is an object of my invention to provide a new and improved electric control and regulating system.

It is another object of my invention to provide a new and improved electric valve control system.

It is a further object of my invention to provide a new and improved electric valve regulating system for dynamo-electric machines.

Briefly stated, in the illustrated embodiment of my invention I provide an improvement in electric regulating systems of the type broadly disclosed and claimed in my copending patent application Serial No. 380,227, filed concurrently herewith, and which is assigned to the assignee of the present application. More particularly, my improved regulating system relates to an electric valve regulating circuit or apparatus employing electric discharge means wherein the current transmitted through a load circuit, such as the control or field winding of a dynamo-electric machine, is precisely controlled to maintain an electrical condition of an associated circuit or electrical apparatus at a definite predetermined value. The system includes an electronic amplifier in which means are provided for producing a positive feed-back voltage which cooperates with the control voltage to increase the sensitivity of the amplifier, but which does not introduce the feed-back effect until the current change has been effected. For example, the means for introducing the feed-back voltage may comprise a resistance connected in series relation with the load circuit and produces the positive feed-back voltage only after the current through the load circuit has increased. Other means are provided for adjusting or compensating the operation of the amplifier for variations in magnitude of the direct current supply voltage.

For a better understanding of my invention, reference may be had to the following description taken in connection with the accompanying drawing, and its scope will be pointed out in the appended claims. Fig. 1 diagrammatically illustrates an embodiment of my invention as applied to a regulating system for controlling the output voltage of a direct current generator and which includes an electronic amplifier and a loaded counter E. M. F. motor which control the field energization of the generator. Fig. 2 represents certain operating characteristics of the electronic amplifier.

Referring now to Fig. 1 of the accompanying drawing, I have there illustrated my invention as applied to an electric regulating system for controlling an operating or an electrical condition, such as the output voltage, of a direct current generator 1 comprising an armature winding 2, a field winding 3 and a commutating winding 4. As a means for controlling the current transmitted to the field winding 3, I employ suitable control apparatus such as a loaded counter E. M. F. motor 5 having an armature 6 and field windings 7, 8 and 9. Field windings 7 and 8 may be connected in series relation, as illustrated, across the armature or load circuit of the generator 1. Furthermore, the field winding 9 may be arranged to produce a magnetomotive force which opposes the combined effect of the field windings 7 and 8 and may be proportioned to have a magnetomotive force which is less than the combined magnetomotive forces of windings 7 and 8. By variably energizing winding 9, the excitation of the counter E. M. F. motor 5 is controlled and, hence, the field winding 3 of generator 1 is variably energized. A generator field rheostat 10 may be connected in series relation with the armature 6 of motor 5 and field winding 3. Generator 1 may be employed in a system for charging a battery 11, and a suitable circuit controlling means such as a switch 12 may be connected in series relation with the armature 2 of generator 1.

I provide an electronic amplifier 13 for variably energizing the field winding 9 of motor 5 in response to a predetermined electrical condition such as the armature voltage of generator 1, or the voltage of the load circuit, to maintain the voltage constant. The electronic amplifier 13 comprises a source of direct current including a positive conductor 14 and a negative conductor 15 and may be supplied by a rectifier 16, of the bi-phase type, energized from a suitable source of alternating current. The rectifier 16 may comprise a transformer 17 and an electric valve 18. Primary winding 19 of the transformer 17 may be provided with taps 20 and 21 and a switch 22 in order to control the magnitude of the voltage of the direct current source comprising conductors 14 and 15. If desired, a suitable filter circuit may be connected between the rectifier 16 and the amplifier 13, and this filter circuit may comprise an inductance 23 and a capacitance 24 connected in the manner indicated. It is to be understood, of course, that other suitable filter equipment may be employed.

Electronic amplifier 13 includes an electronic discharge device 25, preferably of the high vacuum type, having an anode 26, a cathode 27 and a control grid 28, which transmits variable amounts of unidirectional current through the control or field winding 9 of the counter E. M. F. motor thereby controlling its excitation and its effective armature voltage or counter E. M. F. As a means for controlling the potential of the control grid 28 in response to a predetermined electrical condition of the associated equipment, such as the armature voltage of generator 1 or the voltage of the load circuit, I provide a second electronic discharge device 29, also preferably of the high vacuum type, which is connected in series relation with a suitable impedance element such as a resistance 30. Electronic discharge device 29 transmits variable amounts of current through resistance 30 and, hence, controls the potential of the grid 28. Electronic discharge device 29 comprises an anode 31, a cathode 32, a cathode heating element 33 and may comprise control means such as a control grid 34, a screen grid 35 and a suppressor grid 36 which is preferably connected to the cathode 32.

In order to impress on the control means, such as the control grid 34, a potential which varies in accordance with the output voltage of generator 1 or the load voltage, I provide a circuit including resistances 37, 38 and 39 which are connected from the positive terminal of the load circuit. Resistance 38 may be provided with an adjustable contact 40 which is connected to the control grid 34 through a suitable source of biasing or reference potential, such as a battery 41, and through a resistance 42.

I provide means for impressing on the discharge device 29 a positive feed-back voltage which is responsive to the current transmitted through the field winding 9 by electronic discharge device 25. This means may comprise a resistance 43 which is connected in series relation with field winding 9 and is also connected to the cathode 32 of discharge device 29. Due to the fact that the resistance 43 is connected in series relation with field winding 9, there is obtained a dual effect, that is, the production of a positive feed-back voltage having a definite time delay which is determined or controlled principally by the inductance of the field winding 9. Consequently, the feed-back effect is not fully obtained until the current change dictated by the system has been accomplished. The resistance 43 may be made adjustable to control the sensitivity of the amplifier 13 and the operation or effect of this resistance will be explained hereinafter in connection with the operating characteristics shown in Fig. 2.

As an agency for controlling the operation of the electronic amplifier 13 in order to compensate for undesirable variations in the magnitude of the voltage appearing across conductors 14 and 15, due to variations in the voltage of transformer 17 or due to variations in the power transmitted through the rectifier 16, I provide means for varying the potential of the control means, such as screen grid 35, in response to variations in the voltage of the source. This means may comprise a voltage divider, including resistances 44 and 45, which are connected in series relation with the upper portion of the current adjusting rheostat 46 across the direct current source. In this manner, a predetermined component of the voltage of the source is impressed on the screen grid 35 to compensate the operation of discharge device 29 for variations in the voltage of the source. As a further means for compensating the operation of the discharge device 29 for variations in the magnitude of the source, I provide means for variably energizing the cathode heating element 33 in response to the voltage of the source. The cathode heating element 33 may be connected across the source through resistances 44 and 45 and a portion of resistance 46. In this manner, the temperature of the cathode 32 and hence the anode-cathode current varies in a manner to compensate for variations in the anode-cathode voltage or the voltage of the direct current source.

The current adjusting rheostat 46 is employed to control the maximum value of current transmitted to the load circuit by limiting the maximum voltage difference between the control means, such as control grid 34, and cathode 32. This operation may be effected by employing a suitable current responsive means, such as a relay 47 having a plunger 48, an actuating coil 49, movable contacts 50 and 51 and stationary contacts 52, 53 and 54. A suitable shunt 55 may be connected in series relation with the load circuit to provide a voltage which is proportional to the current and which effects energization of the actuating coil 49 to move the plunger downwardly when the load current attains a predetermined value, the movable contacts being biased to the position shown by the spring means.

The operation of the embodiment of my invention shown in Fig. 1 will be explained by considering the system when it is operating to maintain the load voltage, or the voltage impressed across the terminals of the battery 11, at a constant value. Variable amounts of current are transmitted to the field winding 3 of generator 1 by virtue of the operation of the counter E. M. F. motor 5. It will be appreciated that as the resultant or net excitation of the generator 1 varies, the counter E. M. F. of the motor 5 opposes the terminal or armature voltage of generator 1 in varying amounts to control the resultant field current through winding 3. That is, as the net or resultant excitation of motor 5 increases, the counter E. M. F. of the motor 5 correspondingly increases effecting a decrease in the field current through winding 3. Conversely, a decrease in the net excitation of motor 5 will cause an increase in the field current through winding 3. Winding 9 opposes in effect windings 7 and 8 of motor 5 so that an increase in energization of winding 9 decreases the net or resultant excitation of motor 5, and a decrease in the energization of winding 9 increases the net excitation of motor 5.

Electronic regulator 13 transmits variable amounts of unidirectional current to field winding 9 of motor 5 to maintain the output voltage or armature voltage of generator 1 at a constant value. Variations in the load voltage or armature voltage are impressed on control grid 34 of electronic discharge device 29 to transmit variable amounts of current through resistances 30 and thus to impress a variable control potential on grid 28 of discharge device 25. The latter discharge device transmits variable amounts of unidirectional current to field winding 9 from the direct current source including conductors 14 and 15. For example, if it be assumed that the load voltage tends to rise above a predetermined value, the potential of grid 34 is raised causing discharge device 29 to transmit a larger amount of current and effecting thereby a decrease in potential impressed on grid 28 of electronic discharge device 25. Accordingly, the current transmitted to field winding 9 is decreased, effecting an increase in the net or resultant excitation of motor 5 and causing its armature voltage or counter E. M. F. to increase. Because of the increase in counter E. M. F., the current through field winding 3 will be decreased, tending to restore the generator armature voltage to the desired value. Of course, if the load voltage tends to decrease below the desired value, the reverse operation will take place to raise the generator armature voltage to the desired value.

The potential impressed on control grid 34 for small variations thereof effects substantial changes in the conductivity of electronic discharge device 29 and causes correspondingly great or abrupt changes in the current conducted by discharge device 25. The voltage adjusting rheostat 38 may be proportioned or adjusted so that the discharge device 29 is changed in its operation from cut-off to the saturated region, or vice versa, for small changes in the magnitude of the voltage impressed between control grid 34 and cathode 32, thereby effecting corresponding abrupt changes in the conductivity of discharge device 22 and rapid changes in current transmitted through control or field winding 9 of motor 5. By means of the positive feed-back voltage derived from resistance 43, the rapid or abrupt change from cut-off to saturation, or vice versa, of discharge device 29 is accelerated. This feature of operation of the electronic amplifier 13 may be more fully appreciated by referring to the operating characteristics shown in Fig. 2. The heavy curve A represents the current through the control winding 9 as a function of the voltage impressed on grid 34 of discharge device 29. Curve B represents the ordinary anode-cathode current-grid voltage characteristic of discharge device 29 having a cut-off characteristic which is relatively sharp. The central portion of curve A may be made to have a substantially horizontal relationship to obtain abrupt change from cut-off to saturation by adjustment of resistance 43. By decreasing the magnitude of the resistance 43 to decrease the feed-back voltage impressed between cathode 32 and control grid 34, the rate of response or the rate of change of the current through winding 9 may be adjusted to assume values corresponding to the dotted curves a, b, c or d. As the magnitude of the feed-back voltage is decreased by decreasing the value of resistance 43, the central portion of curve A approaches as a limit the portion of the grid voltage characteristic curve B lying between cut-off and saturation. In this manner, the sensitivity and speed of response of the amplifier 13 for variations in load voltage may be controlled or adjusted.

When the relay 47 is in the position shown in the drawing, the circuit through which the feed-back voltage is effective includes resistance 43, the lower portion of the current-adjusting rheostat 46, contacts 53 of relay 47, battery 11, resistance 37, the right-hand portion of resistance 38, battery 41, resistance 42, and grid 34 and cathode 32 of discharge device 29. When the relay 47 is in the energized position corresponding to the current-control position, the circuit through which the feed-back voltage is effective includes resistance 43, the lower portion of the current-adjusting rheostat 46, contacts 54 of relay 47, shunt 55, contacts 52 of relay 47, grid 34 and cathode 32 of discharge device 29.

An important advantage of apparatus built in accordance with my invention, particularly as applied to the control of a load circuit having an appreciable inductance such as the field winding of a dynamo-electric machine, is the manner in which the variation in current through the load circuit may be employed as a damping circuit, that is, as a damping control with respect to the time of application of the feed-back voltage. Referring particularly to the anode-cathode circuit of the electronic discharge device 25 which is connected in series relation with field winding 9 and resistance 43, the feed-back voltage does not become effective until the current change has taken place. This is true because the voltage drop across resistance 43 does not change until the current has changed. Consequently, the change in feed-back voltage does not become effective until the current has changed. In this manner, the system operates without appreciable hunting by utilizing the characteristic of the load circuit in conjunction with the positive feed-back feature.

Amplifier 13 operates to maintain precisely the voltage of the load circuit irrespective of variations in the magnitude of the direct current source including conductors 14 and 15. This control is obtained by impressing on the screen grid 35 a voltage which compensates the operation of the discharge device 29 and, hence, corrects the operation of the amplifier 13 for variations in the voltage of the direct current source. For example, were it not for this compensating feature, the magnitude of the load voltage which is maintained by the system would vary with the voltage of the source. If the voltage of the source tends to rise, the potential impressed on screen grid 35 correspondingly rises effecting a lowering in potential of grid 28 of discharge device 25, thereby decreasing the potential of grid 28 to compensate for the increase in anode-cathode voltage of this discharge device so that the same value of current is transmitted to field winding 9 for a definite value of load voltage. The amplifier circuit 13 is also additionally compensated for variations in the direct current source by variably energizing the cathode heating element 33 in response to the voltage of the source. If the voltage tends to vary from the desired value, the current transmitted to the cathode heating element 33 will also be varied to change the temperature of the cathode 32, thereby changing the current conducted by the discharge device 29 to raise or lower the potential of grid 28 of electronic discharge device 25 so that the same value of current is transmitted to winding 9 for a definite signal or control voltage derived from the load circuit.

By means of resistance 38, the output voltage of the generator 1 or the load voltage may be controlled or adjusted. Through the operation of the relay 47, if the load current tends to increase above a predetermined value the electronic amplifier 13 is controlled to maintain constant load current. This operation is effected in the following manner. Upon increase of load current to a predetermined value, actuating coil 49 of relay 47 is sufficiently energized, pulling the plunger 48 downwardly to close contacts 52 and 54. As a result, battery 41 is shunted through resistance and contacts 52 of relay 47, thereby rendering ineffective the reference voltage of this battery. Upon closure of contacts 52 and 54 of relay 47, variable amounts of unidirectional current are transmitted from shunt 55 through the lower portion of resistance 46 and resistance 43 in response to the current transmitted by the load circuit. When contacts 52 and 54 of relay 47 close, battery 41 and resistances 37—39 are effectively shunted so that the control effect is produced exclusively by the voltage variation appearing across the terminals of shunt 55. If the current tends to rise above the predetermined value, the control grid 34 of discharge device 29 is raised in the positive direction to transmit a corresponding amount of current through resistance 30 and consequently effects a lowering in potential of grid 28. Accordingly, the current transmitted to field winding 9 is decreased, causing an increase in the resultant excitation of the counter E. M. F. motor 5. This increase in excitation increases the counter E. M. F. of the motor and decreases the excitation of generator 1, thereby restoring the current to the desired value. Of course, the system operates to maintain the load current constant irrespective of any tendency of the load current to vary in either direction.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine having a control winding, a source of direct current comprising positive and negative conductors, an electronic discharge device, having a grid, connected to transmit variable amounts of unidirectional current through said control winding, a serially connected resistance and a second electronic discharge device energized from said direct current circuit for impressing a variable control potential on said grid, said second electronic discharge device having an anode, a cathode and a control grid, and feed-back means responsive to the current transmitted through said control winding to impress a positive feed-back voltage between said cathode and grid of said discharge device.

2. In combination, a dynamo-electric machine having a control winding, a source of direct current comprising a positive conductor and a negative conductor, an electronic discharge device, having a grid, connected to transmit variable amounts of unidirectional current through said control winding, a serially connected resistance and a second electronic discharge device energized from said direct current circuit for impressing a variable control potential on said grid, said second electronic discharge device having a control grid, and feed-back means comprising a resistance connected in series relation with the first mentioned discharge device and said control winding for impressing a positive feed-back voltage on the grid of said second discharge device.

3. In combination, a dynamo-electric machine having a control winding, a direct current circuit having positive and negative conductors, an electronic discharge device energized from said direct current circuit for transmitting variable amounts of unidirectional current through said control winding, said discharge device having a grid, means energized from said direct current circuit and comprising a serially connected resistance and a second electronic discharge device for impressing a variable control potential on said grid, said second electronic discharge device comprising an anode, a cathode and a pair of control grids, means for impressing on one of said pair of control grids a voltage which varies in accordance with a predetermined controlling influence, feed-back means connected in series relation with the first mentioned discharge device and said control winding for impressing a positive feed-back voltage on said second discharge device in response to the flow of current through said control winding, and means connected across said source for impressing on the other control grid a voltage to compensate the operation of said second discharge device for variations in the voltage of said direct current circuit.

4. In combination, a dynamo-electric machine having a control winding, a direct current circuit having positive and negative conductors, an electronic discharge device energized from said direct current circuit for transmitting variable amounts of unidirectional current through said control winding, said discharge device having a grid, means energized from said direct current circuit and comprising a serially connected resistance and a second electronic discharge device for impressing a variable control potential on said grid, said second discharge device comprising an anode, a cathode and a pair of control grids, means responsive to a predetermined controlling influence for varying the potential of one of said pair of control grids, means responsive to a second predetermined controlling influence for varying the potential on said one grid, means connected across said direct current circuit for varying the potential of the other of said pair of grids to compensate the operation of said second discharge device for variations in the voltage of said direct current circuit, and means responsive to the current transmitted through said control winding for impressing on one of said pair of grids a positive feed-back voltage.

5. In combination, a dynamo-electric machine having a control winding, a direct current circuit having positive and negative conductors, an electronic discharge device energized from said direct current circuit for transmitting variable amounts of unidirectional current through said control winding, said discharge device having a grid, means energized from said direct current circuit and comprising a serially connected resistance and a second electronic discharge device for impressing a variable control potential on said grid, said second electronic discharge device comprising an anode, a cathode and a pair of control grids, means for impressing on one of said control grids a voltage which varies in accordance with a predetermined controlling influence comprising a second resistance, means for modifying the last mentioned voltage in response to the current transmitted through said resistance, means for impressing on the other of said pair of grids a voltage to compensate for variations in the magnitude of the voltage of said direct current circuit, and feed-back means connected in series relation with the first mentioned discharge device and said control winding for impressing on one of said pair of grids a positive feed-back voltage.

6. In combination, a direct current circuit, a load circuit, electric apparatus for controlling the energization of said load circuit comprising a dynamo-electric machine having a control winding, a source of direct current, an electronic discharge device, having a grid, energized from said source for transmitting variable amounts of unidirectional current through said control winding, means energized from said source and comprising a serially connected resistance and a second electronic discharge device for impressing a variable control potential on said grid, said second electronic discharge device comprising an anode, a cathode and a pair of control grids, means for impressing on one of said pair of control grids a voltage which varies in response to the voltage of said direct current load circuit, means comprising a voltage divider connected across said source for impressing on the other grid of said pair of grids a voltage to compensate the operation of said second discharge device for variations in the magnitude of the voltage of said source, and feed-back means responsive to the current transmitted through said control winding for impressing a positive feed-back voltage on one of said pair of grids.

7. In combination, a direct current circuit, a load circuit, means for energizing said load circuit from said direct current circuit comprising an electronic discharge device having a grid, means for impressing on said grid a variable potential comprising a serially connected resistance and a second electronic discharge device comprising an anode, a cathode, a cathode heating element and control means, means for impressing on said control means a variable voltage to control the energization of said load circuit, means responsive to the current transmitted through said load circuit for impressing a positive feed-back voltage on said control means, and means for variably energizing said cathode heating element in response to the voltage of said direct current circuit thereby compensating the operation of said second electronic discharge device for variations in the magnitude of the voltage of said direct current circuit.

8. In combination, a direct current circuit, a load circuit, means for energizing said load circuit from said direct current circuit comprising an electronic discharge device having a grid, means for impressing on said grid a variable potential comprising a serially connected resistance and a second electronic discharge device comprising an anode, a cathode, a cathode heating element and a control means, means for impressing on said control means a control voltage variable in response to a predetermined controlling influence, means comprising a voltage divider connected across said direct current source for impressing on said control means a voltage proportional to the voltage of said direct current circuit to compensate the operation of said second discharge device for variations in the voltage of said direct current circuit, means comprising a resistance connected in series relation with said load circuit for impressing on said control means a positive feed-back voltage to increase the sensitivity of said second discharge device with respect to variations in said control voltage, and means for variably energizing said cathode heating element in response to the voltage of said direct current circuit.

9. In combination, a direct current circuit, a load circuit, means for variably energizing said load circuit comprising an electronic discharge device having a grid, means for impressing a variable control potential on said grid to control the amount of current transmitted to said load circuit comprising a serially connected resistance and a second electronic discharge device comprising an anode, a cathode, a cathode heating element, a control grid and a screen grid, means for impressing on said control grid a potential which varies in accordance with a predetermined controlling influence, feed-back means for impressing on said control grid a positive feed-back voltage in response to the current transmitted through said load circuit, means comprising a voltage divider connected across said direct current circuit for impressing on said screen grid a voltage proportional to the voltage of said direct current circuit thereby compensating the operation of said second discharge device for variations in the magnitude of the voltage of said direct current circuit, and means for variably energizing said cathode heating element in response to the magnitude of said direct current circuit.

10. In combination, a direct current load circuit, means for controlling the energization of said load circuit comprising a dynamo-electric machine having a control winding, apparatus for variably energizing said control winding comprising a source of direct current, an electronic discharge device having a grid for transmitting variable amounts of unidirectional current through said control winding from said source, means for impressing on said grid a variable control potential comprising a serially connected resistance and a second electronic discharge device comprising an anode, a cathode, a cathode heating element, a control grid and a screen grid, means for impressing on said control grid a voltage which varies in response to the voltage of said direct current load circuit, means for impressing on said control grid a positive feed-back voltage in response to the current transmitted through said control winding, means comprising a voltage divider connected across said source for impressing a compensating voltage on said screen grid, means for variably energizing said cathode heating element in response to the voltage of said source, and means connected between said direct current load circuit and said control grid for varying the voltage of said control grid to maintain constant the current of said direct current load circuit.

11. In combination, a direct current load circuit, means for controlling the energization of said load circuit comprising a dynamo-electric machine having a control winding, apparatus for variably energizing said control winding comprising a source of direct current, an electronic discharge device, having a grid, for transmitting variable amounts of unidirectional current through said control winding from said source, means for impressing on said grid a variable control potential comprising a serially connected resistance and a second electronic discharge device comprising an anode, a cathode, a cathode heating element, a control grid and a screen grid, means for impressing on said control grid a voltage which varies in response to the voltage of said direct current load circuit, means for impressing on said control grid a positive feedback voltage in response to the current transmitted through said control winding, means comprising a voltage divider connected across said source for impressing a compensating voltage on said screen grid, means for variably energizing said cathode heating element in response to the voltage of said source, and means responsive to a predetermined value of current transmitted by said direct current load circuit for controlling the potential difference between said control grid and said cathode to maintain constant current in said load circuit.

12. In combination, a direct current load circuit, means for controlling the energization of said load circuit comprising a dynamo-electric machine having a control winding, apparatus for variably energizing said control winding comprising a source of direct current, an electronic discharge device, having a grid, for transmitting variable amounts of unidirectional current through said control winding from said source, means for impressing on said grid a variable control potential comprising a serially connected resistance and a second electronic discharge device comprising an anode, a cathode, a cathode heating element, a control grid and a screen grid, means for impressing on said control grid a voltage which varies in response to the voltage of said load circuit to maintain the voltage of said load circuit at a constant value, means for impressing on said control grid a positive feedback voltage in response to the current transmitted through said control winding, and means responsive to load current of a predetermined value for controlling the potential difference between said control grid and said cathode thereby maintaining the load current constant.

13. In combination, a direct current circuit, a load circuit, means for energizing said load circuit from said direct current circuit comprising an electronic discharge device having a grid, means for impressing on said grid a variable potential comprising a serially connected impedance element and a second electronic discharge device comprising an anode, a cathode and control means, means for impressing on said control means a variable voltage to control the energization of said load circuit, and means responsive to the current transmitted through said load circuit for impressing a positive feed-back voltage on said control means.

14. In combination, a direct current circuit, an inductive load circuit, means for energizing said load circuit from said direct current circuit comprising an electronic discharge device having a grid, means for impressing on said grid a variable potential comprising a serially connected resistance and a second electronic discharge device comprising an anode, a cathode and control means, control means connected to said control means and comprising means responsive to a predetermined electrical condition of said load circuit for impressing on said control means a variable voltage to control the energization of said load circuit, and means responsive to the current transmitted through said load circuit for impressing a positive feed-back voltage on said control means, the inductance of said load circuit constituting with said control means a damping circuit.

JERRY L. STRATTON.